(12) United States Patent
Chakra et al.

(10) Patent No.: US 7,865,592 B2
(45) Date of Patent: Jan. 4, 2011

(54) USING SEMANTIC NETWORKS TO DEVELOP A SOCIAL NETWORK

(75) Inventors: Al Chakra, Apex, NC (US); Fernando Barsoba, Durham, NC (US); Marshal Allen Lamb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 12/147,125

(22) Filed: Jun. 26, 2008

(65) Prior Publication Data
US 2009/0327417 A1 Dec. 31, 2009

(51) Int. Cl.
*G06F 15/16* (2006.01)
(52) U.S. Cl. .............................. 709/224; 709/250
(58) Field of Classification Search ......... 709/217–218, 709/223–229, 250
See application file for complete search history.

(56) References Cited

U.S. PATENT DOCUMENTS 7,069,308 B2 * 6/2006 Abrams ...................... 709/218
7,293,109 B2 * 11/2007 Ott et al. ..................... 709/249
2002/0091556 A1 * 7/2002 Fiala et al. ...................... 705/6
2007/0162547 A1 * 7/2007 Ross ........................... 709/204
2008/0091684 A1 * 4/2008 Ellis et al. ..................... 707/10
2008/0235046 A1 * 9/2008 Fitzpatrick et al. ............. 705/1
2008/0281622 A1 * 11/2008 Hoal ............................. 705/1
2008/0288596 A1 * 11/2008 Smith et al. ................. 709/206

OTHER PUBLICATIONS

Peter A. Gloor et al., Temporal Visualization and Analysis of Social Networks.
Hady W. Lauw et al., Mining Social Network from Spatio-Temporal Events.
Lubomira Stoilova et al., Mining a Semantic Network of Bookmarks for Web Search and Recommendation.

* cited by examiner

*Primary Examiner*—Zarni Maung
(74) *Attorney, Agent, or Firm*—Steven E. Bach

(57) ABSTRACT

A method, apparatus and program product are provided for identifying common interests between users of a communication network. A program of instruction monitors activity over a communication network by users and identifies interests for users based on network activity. The program of instruction creates semantic networks based on use of the communication network and identifies other users with common interests from the semantic networks. Optionally, social networks may be created or modified by adding other users with common interests as identified by semantic networks.

18 Claims, 3 Drawing Sheets

USING SEMANTIC NETWORKS TO DEVELOP A SOCIAL NETWORK

FIELD OF THE INVENTION

The invention relates to the field of computer networking and more particularly to a method, apparatus and program product for using information derived from network usage to develop a social network.

BACKGROUND

Many Internet users make frequent searches for information, such as product reviews, hotels and travel destinations, and the like, as well as for on-line services such as shopping sites. Such Internet users are typically inundated with meaningless results for each on-line search. Search engines have made searching easier, but a user often needs to sort through irrelevant results and irrelevant web pages before finding a desired piece of information or a desired shopping site. Thus, even with all of the access to information that an Internet user has at his/her disposal today, many users elect to asking for advice from a friend or acquaintance before beginning a search. However, an Internet user might not know who to turn to for information about a specific subject.

One way for an Internet user to communicate with others is through a social network. A social network is a social structure made of nodes (which are generally individuals or organizations) that are tied by one or more specific types of interdependency, such as values, visions, ideas, financial exchange, friendship, kinship, interests, etc. Social networks are typically built using a priori knowledge of the nodes (such as adding existing friends or known organizations).

Semantic networks are often used as a form of knowledge representation. A semantic network comprises a plurality of concepts interconnected by various relationships. A semantic network may be illustrated as a directed graph consisting of vertices, which represent concepts, and edges, which represent semantic relationships between the concepts. Such networks involve fairly loose semantic associations. As shown in FIG. 1, an exemplary semantic network can represent knowledge about trees. The first concept, trees 110 is connected to other concepts that have a semantic relationship to trees. For example, stories and poems about trees 120 are concepts that are related to trees through a semantic relationship of literature 121. Similarly, clear-cutting and diseases 130 are a concept related to trees 110 by the semantic relationship of threats 131. Long term and environmental issues 132 are concepts related to the concept of clear-cutting and disease by the semantic relationship of effects 133. Other concepts 140, 150, 160, 170, 180, 190 are also related to the concept of trees 110 by various semantic relationships 141, 151, 161, 171, 181, 191.

SUMMARY

A method, apparatus and program product are provided for identifying common interests between users of a communication network. According to an exemplary embodiment, a program of instruction monitors activity over a communication network by users and identifies interests for users based on network activity. The program of instruction creates semantic networks based on use of the communication network and identifies other users with common interests from the semantic networks. Optionally, social networks may be created or modified by adding other users with common interests as identified by semantic networks.

According to an exemplary embodiment, interests are identified by determining relevance of content viewed over the network. This relevance may be determined, for example, by calculating a ratio of the number of words in a content source to the time spent viewing the content. Interests may be further identified by analyzing viewed content to determine one or more concepts from the usage.

Semantic networks may be created by adding concepts corresponding to the identified interests to a semantic network, and connecting the added concepts to existing concepts by probable relationships. The semantic networks may be stored for a plurality of users. The concepts in the semantic networks may then be used to match users with one or more selected interests in common.

BRIEF DESCRIPTION OF THE DRAWINGS

The features and advantages of the invention will be more clearly understood from the following detailed description of the preferred embodiments when read in connection with the accompanying drawing. Included in the drawing are the following figures.

DETAILED DESCRIPTION

The present invention provides a method, apparatus and program product for using information derived from usage of a communication network to develop a social network. According to an exemplary embodiment, a network user may develop a social network by first establishing a semantic network to identify concept related to the user's usage of the communication network. Then, individuals and organizations related to that concept are identified to build a social network related to a particular communication network usage.

Figure 1:
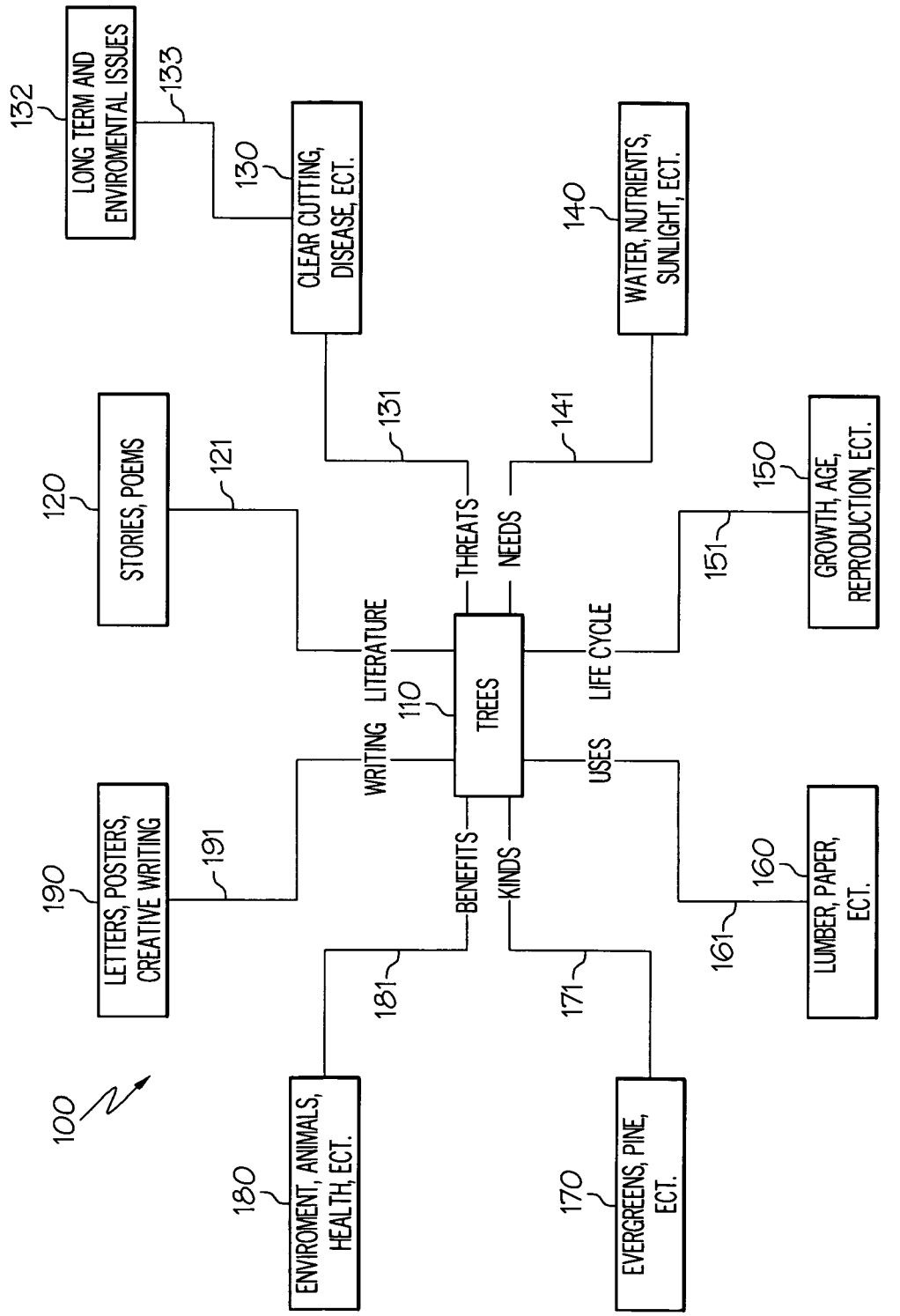
FIG. 1 is an illustration of an exemplary semantic network as is known in the prior art.
Figure 2:
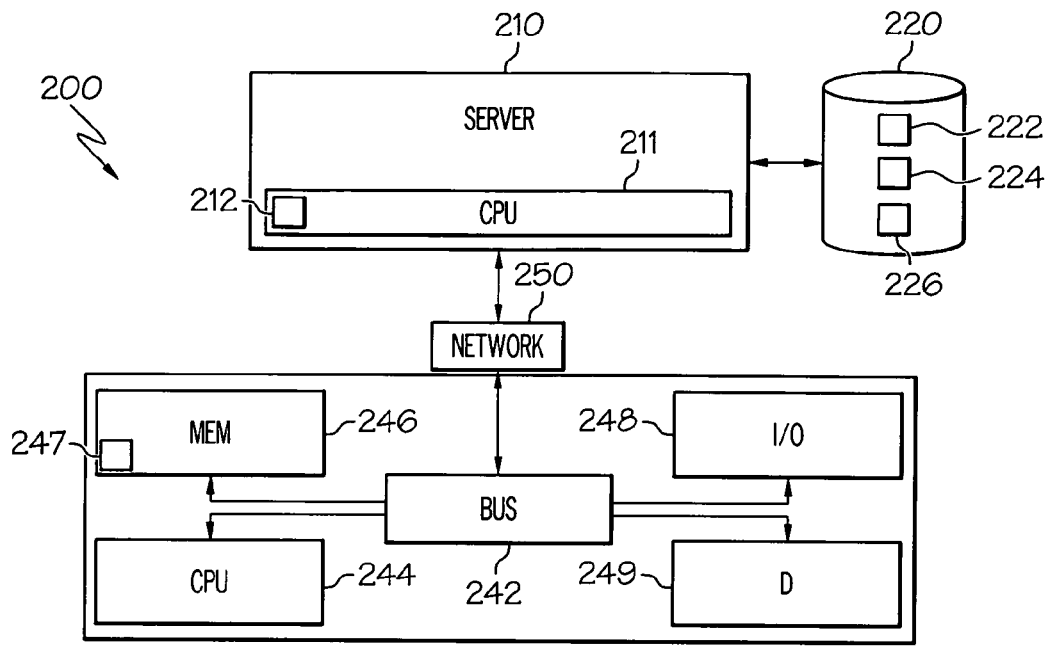
FIG. 2 is a block diagram of an apparatus for using information derived from network usage to develop a social network according to an exemplary embodiment of the present invention.

As shown in FIG. 2, an apparatus 200 for using information derived from usage of a communication network to develop a social network is provided according to an exemplary embodiment. The apparatus 200 comprises a server 210 with a processing unit 211. The server 210 is configured to enable communication over a network 250. A user may interconnect with the server 210 using a personal computer (PC) 240, for example, in a client/server architecture, as shown. Alternatively, a user may interconnect through the network 150 using a personal digital assistant (PDA), a terminal, or any other computing device suitable for network connection. Also, alternative architectures may be used instead of the client/server architecture. For example, a PC network, or other suitable architecture may be used. The network 250 may be the Internet, an intranet, or any other network suitable for searching, obtaining, and/or using information and/or communications.

An operating system 212 is installed on the server 210, enabling server 210 to communicate through network 250. The operating system may be any operating system known in the art that is suitable for network communication.

A memory 220 is interconnected with the server 210. Memory 220 may be integral with server 210 or may be external to the server and interconnected therewith. A program of instruction 222 is stored on memory 220. According to an exemplary embodiment, the program of instruction 222 is computer executable code for using information derived from usage of a communication network to develop a social network. Alternatively, portions of the program of instruction 222 or the whole program of instruction may be installed on a user's computing device 240.

A user may connect to the server 210 through network 250 from a computing device 240. According to an exemplary embodiment, computing device 240 is a personal computer. Computing device 240 may comprise a bus 242 interconnected to the network 250 such as through a modem, an Ethernet card, or the like. A processing unit 244 may be interconnected with the bus 242. A memory 246 may be interconnected with the processing unit 244 through bus 242. The computing device 240 may also comprise one or more input/output devices 248, such as a mouse, a keyboard, a printer, and the like interconnected to the processing unit 244 through bus 242. A display 249 may be interconnected with the processing unit 244 through bus 242 for providing a graphical user interface.

Computing device 240 may have a program of instruction 247, such as a driver enabling computing device 240 to interconnect with server 210 through network 250.

When the user uses network 250, the server 210 executes the program of instruction 222 stored in memory 220. The program of instruction 222 detects attributes of the usage, and uses those attributes to build a semantic network 224. The server stores the semantic network 224 in memory 220. As will be described in greater detail below, the semantic network 224 comprises concepts (represented by vertices) and relationships (represented by edges) which relate those concepts to the user.

The program of instruction 222, then uses the semantic network 224 to identify concepts of interest to the user, and to build a social network 226 based on those interests. This social network may be temporal, automatically being disbanded upon some completion event, such as the user logging out, or the user responding positively to a prompt to terminate the social network. Alternatively, the social network may remain in effect until proactively terminated by the user. Optionally, other users with common interests may be prompted as to whether or not they wish to join the social network, and added only if they take an acceptance action.

Figure 3:
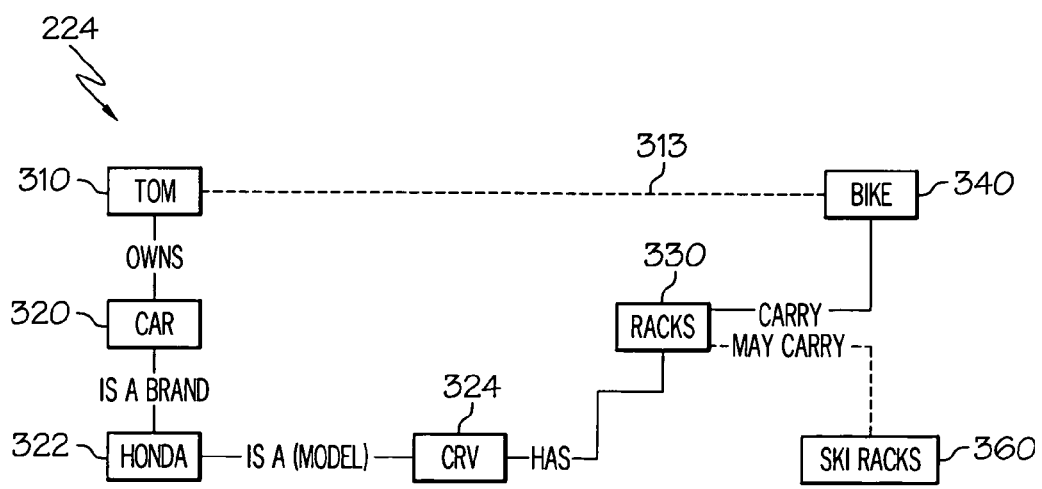
FIG. 3 is an illustration of a semantic network formed using information derived from network usage to develop a social network according to an exemplary embodiment of the present invention.

FIG. 3 illustrates an exemplary semantic network 224 based on usage of a communication network 150. In the illustrated exemplary embodiment, a user, Tom, owns a Honda® CR-V®, and is interested in getting a bike rack for it. The semantic network 224 begins with a concept for Tom 310. A concept for car 320 is connected to Tom by the directional relationship, owns 311. The ownership relationship 321 for a car 320 may have existed in the semantic network 224 prior to Tom's search for a bike rack or may have been created by the program of instruction based on this search. Further concepts are added relating to car 320. The concept, Honda® 322 is added connected to car 320 by the relationship "is a brand" 321, and the concept CR-V® 324 is added connected to Honda® by the relationship "is a model" 323.

Based on Tom's search and subsequent Internet browsing, the program of instruction 222 determines that Tom is interested in or has a rack 330 for his CR-V® 324. This determination may be made by a combination of attributes of Tom's Internet use, such as key words in Tom's search requests, time and content of various web pages that Tom looks at, etc. The program of instruction then adds the concept, racks 330 to the semantic network 224 connected to CR-V® 324 by the relationship "has" 325.

The program of instruction 222 also analyzes Tom's Internet usage to determine that racks 330 are related to the concepts of "bike" 340 and "ski" 350. Accordingly, the program of instruction 222 adds bike 340 and ski 350 to the semantic network 224, connected by the relationships "may carry" 333 and "carry" 331 respectively. As will be described below, the program of instruction 222 may differentiate between the relationships "may carry" and "carry" based on attributes of Tom's Internet usage.

The program of instruction 222 also adds the relationship "owns" 313 from Tom 310 to Bike 340 based on analysis of Tom's Internet usage indicating that Tom likely owns or is interested in owning a bike. The program of instruction may then build a social network for Tom to identify individuals and/or organizations that are related to bikes. For example, the social network might include bike clubs in Tom's area, bike enthusiasts, and the like. Tom may then use the social network to contact the individuals or organizations to inquire about bike racks or about biking.

Figure 4:
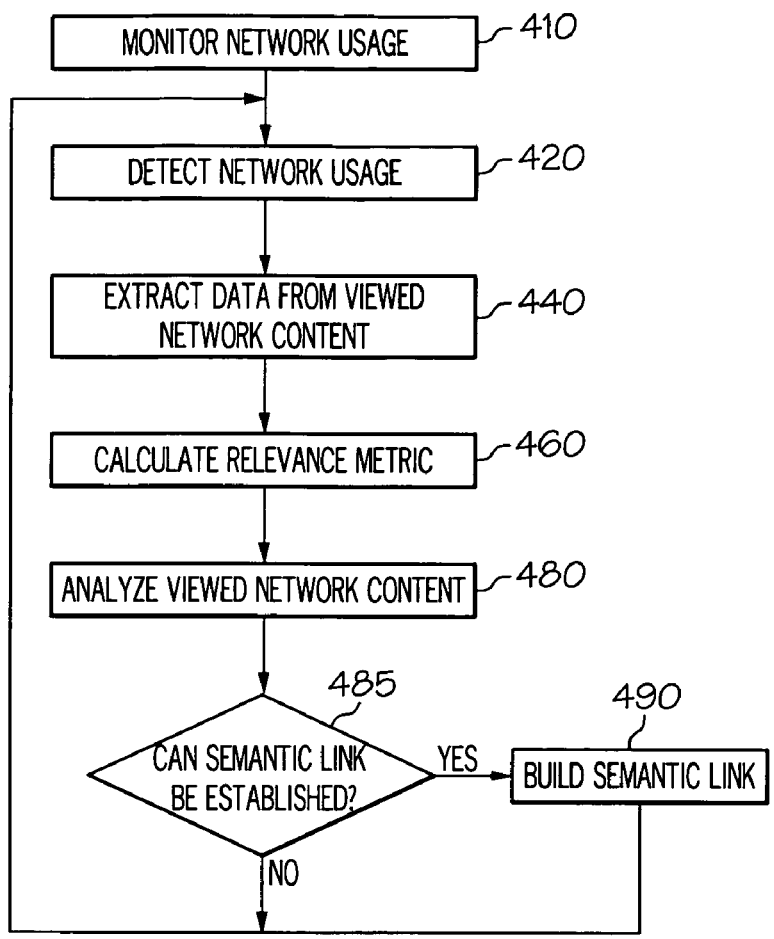
FIG. 4 is a flow diagram of a method for building a semantic network using information derived from network usage according to an exemplary embodiment of the present invention.

A method for building a semantic network based on usage of a communication network according to an exemplary embodiment is shown in FIG. 4. The program of instructions 222 monitors usage of the communication network 250 by a user (step 410). This may be accomplished, for example, by logging web pages downloaded through server 210, by hooking each download request, or by any other means suitable for identifying content viewed by the user. In an exemplary embodiment, users may subscribe to or elect this service, and an account may be established for the user.

When the user downloads web content, the program of instruction detects the network usage (step 420). The usage may be detected, for example, by identifying the content downloaded and the time that the users computing device 240 is connected to a particular content (e.g. web page). If the program of instruction 222 is wholly or in part installed on the user's computing device 240, the program of instruction may measure the time that a particular content is open.

The program of instruction 222 extracts attribute data from the viewed network content (step 440). According to an exemplary embodiment of the invention, the extracted attribute data may include a count of the number of words on a particular content, such as a web page, for example. Alternatively, the program of instruction 222 may extract sentence analysis or syntactic-conceptual analysis of sentences, or the like.

The program of instruction 222 calculates a relevance metric (step 460). According to an exemplary embodiment, the relevance metric may be calculated by dividing the number of words on a particular content by the time spent connected to that content or time that that content is open on the users computing device 240 to determine a relevance ratio. Typically, a user will spend more time viewing content that is closely related to the user's interest than he/she will spend on content that is less relevant. In the foregoing example, the higher the ratio of words to time, the less relevant the content is to an interest of the user.

According to an exemplary embodiment, the program of instruction 222 then analyzes the viewed network content (step 480). The content may be analyzed for main concepts by determining key words, by performing sentence analysis or syntactic-conceptual analysis of sentences, or the like. Using any suitable algorithm for determining significance of words or groups of words, the program of instruction 222 identifies a main concept of the network usage (e.g., 340, 360).

Next, the program of instruction 222 determines whether or not a semantic link can be established from an existing concept to the main concept identified by analysis of the communication network 250 usage (step 485). It is understood that a user may occasionally be distracted during network usage, such as to answer a telephone or the like, and maintain a link to content while not actually reading it. Accordingly, the determination of whether or not to establish a link may require repetitive or similar relevance ratios. Moreover, individual results may be tested using a goodness of fit or other formula to weed out extraneous results. Relevance metrics and main concept analysis may also be tested using confidence testing or other concepts to determine that the results are valid before establishing links in the semantic network.

If the program of instruction determines that a semantic link can not be established, then the program of instruction continues to detect network usage (step 420) and evaluate the usage. If the program of instruction determines that a semantic link can be established, then the program of instruction builds a semantic link in the semantic network (step 490), and the program of instruction continues to detect network usage.

The program of instruction builds a semantic link by first adding the appropriate concept to the semantic network. Then, a directional relationship is added from the existing concept to the newly added concept. As should be understood from the previous description of semantic networks, the user is the first concept in the semantic network. All other concepts are related to the user (e.g., owned by, used by, used for, etc) or to a concept that is related to the user by one or more semantic relationships.

Figure 5:
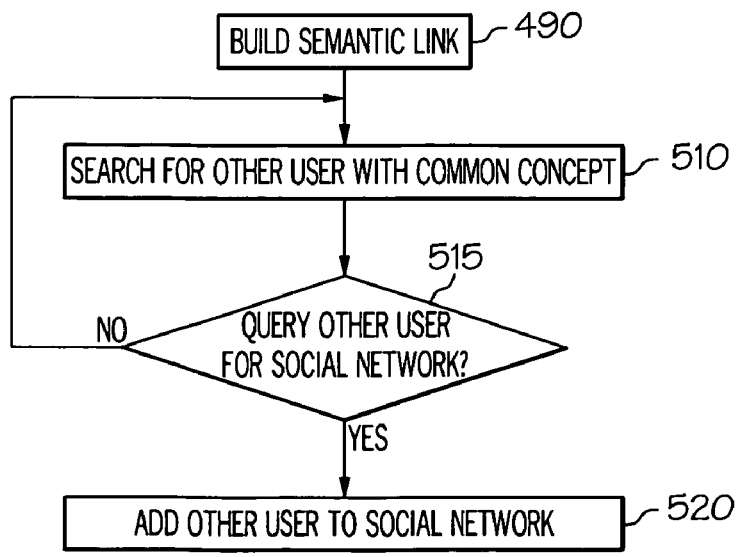
FIG. 5 is a flow diagram of a method for building a social network based on common concepts derived from network usage according to an exemplary embodiment of the present invention.

FIG. 5 shows a method for building a social network based on common concepts derived from network usage according to an exemplary embodiment of the present invention. The program of instruction 222 builds a semantic link (step 490) as described above. According to an exemplary embodiment, the new semantic link triggers the program of instruction to build or expand a social network. The program of instruction for building a semantic network and the program of instruction for building a social network using the concepts of the semantic network may be the same program of instruction or alternatively may be separate programs. According to an alternative exemplary embodiment, building the social network may be triggered by an affirmative command from the user or other event instead of the establishment of a new semantic link.

The program of instruction 222 searches for other users with the newly linked concept in common (step 510). In the example illustrated in FIG. 3, for example, the concept bike 340 has been added to the semantic network 224 by the relationship "owns" 313. In this instance, the program of instruction 222 would search for other users who have a semantic link to the concept of bike. Bike enthusiasts, bike clubs, bike shops, and the like may be identified. In an exemplary embodiment, the search may be limited to other users within a particular geographic area, such as one or more zip codes, a telephone area code, or the like. The search may also be limited to a particular organization affiliation, such as an employer or other affiliation.

The program of instruction 222 queries the identified other user or users (step 515) to determine whether or not they want to be added to or included in a social network. The queries may be performed as each other user with a common interest is identified, or all potential other users may be searched and all queries performed simultaneously. The queries may be performed by email, instant messenger, or any other convenient communication method. Moreover, the query may be performed without identifying the identity of the other user. If the other user replies in the affirmative, then he/she is added to a social network (step 520). If the other user declines, then the program of instruction continues searching.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain, store, communicate, propagate, or transport the program for use by or in connection with the instruction execution system, apparatus, or device.

The foregoing method may be realized by a program product comprising a machine-readable media having a machine-executable program of instructions, which when executed by a machine, such as a computer, performs the steps of the method. This program product may be stored on any of a variety of known machine-readable media, including but not limited to compact discs, floppy discs, USB memory devices, and the like. Moreover, the program product may be in the form of a machine readable transmission such as blue Ray©, HTML, XML, or the like.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A method for identifying common interests between users of a communication network comprising the steps of:
   monitoring activity over a communication network by users;
   identifying interests for users based on network activity;
   creating semantic networks of users' interests based on the users' use of the communication network; and
   identifying users with common interests by comparing the users' respective semantic networks.

2. The method of claim 1, further comprising the step of:
   creating a social network comprising users with one or more common interests.

3. The method of claim 1, wherein the step of identifying interests comprises:
   determining relevance of content viewed over the network.

4. The method of claim 3, wherein relevance of content is determined by calculating a ratio of the number of words in a content source to the time spent viewing the content.

5. The method of claim 4 wherein the step of identifying interests further comprises:
analyzing viewed content to determine one or more concepts from the usage.

6. The method of claim 1, wherein the step of creating semantic networks comprises:
adding concepts corresponding to the identified interests; and
connecting the added concepts to existing concepts by probable relationships.

7. The method of claim 1, wherein the step of identifying common interests from the semantic networks comprises:
storing semantic networks for a group of users; and
matching users with one or more selected interests in common.

8. The method of claim 7, wherein the step of identifying interests comprises analyzing viewed content to identify a main concept for a particular usage and the one or more selected interests in common comprise said main concept.

9. The method of claim 8, wherein the one or more selected interests further comprise a geographic area.

10. The method of claim 8, wherein the one or more selected interests further comprise an organizational affiliation.

11. A program product comprising a non-transitory computer readable storage media having encoded thereon computer executable instructions comprising:
first program instructions for monitoring user activity over a communication network;
second program instructions for identifying interests for users based on network activity;
third program instructions for creating semantic networks of a user's interests based on the user's use of the communication network; and
fourth program instructions for identifying other users with common interests by comparing the users' respective semantic networks.

12. The program product of claim 11, further comprising:
fifth program instructions for creating a social network comprising users with one or more common interests.

13. The program product of claim 11, wherein the program instructions for identifying interests comprise:
determining relevance of content viewed over the network.

14. The program product of claim 13, wherein relevance of content is determined by calculating a ratio of the number of words in a content source to the time spent viewing the content.

15. The program product of claim 14 wherein the program instructions for identifying interests further comprises:
analyzing viewed content to determine one or more concepts from the usage.

16. The program product of claim 11, wherein the program instructions for creating semantic networks comprises:
adding concepts corresponding to the identified interests; and
connecting the added concepts to existing concepts by probable relationships.

17. The program product of claim 11, wherein the program instructions for identifying common interests from the semantic networks comprises:
storing semantic networks for a group of users; and
matching users with one or more selected interests in common.

18. An apparatus for identifying common interests between users of a communication network comprising:
a processing unit;
a memory interconnected with said processing unit; and
a program of instruction stored on said memory;
wherein said processing unit executes said program of instruction to identify interests for users based on network activity, create semantic networks of user interests based on use of the communication network, and identify users with common interests by comparing the semantic networks.

* * * * *